(12) United States Patent
Brenskelle et al.

(10) Patent No.: US 9,982,846 B2
(45) Date of Patent: May 29, 2018

(54) METHOD AND SYSTEM FOR CONTROLLING HYDRODYNAMIC SLUGGING IN A FLUID PROCESSING SYSTEM

(71) Applicant: Chevron U.S.A. Inc., San Ramon, CA (US)

(72) Inventors: Lisa A. Brenskelle, Houston, TX (US); Martin Antonio Morles Bermudez, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 296 days.

(21) Appl. No.: 14/694,871

(22) Filed: Apr. 23, 2015

(65) Prior Publication Data

US 2016/0312959 A1    Oct. 27, 2016

(51) Int. Cl.
*G05D 7/00* (2006.01)
*G05D 11/00* (2006.01)
(Continued)

(52) U.S. Cl.
CPC ............... *F17D 3/05* (2013.01); *E21B 43/34* (2013.01); *F17D 1/005* (2013.01); *F17D 5/00* (2013.01); *G05B 15/02* (2013.01)

(58) Field of Classification Search
CPC ... F17D 1/005; F17D 3/05; F17D 5/00; F21B 43/34; G05B 15/02
See application file for complete search history.

(56) References Cited

U.S. PATENT DOCUMENTS 5,478,504 A * 12/1995 de Almeida Barbuto .................. E21B 17/01
                                                                 137/110
6,390,114 B1 * 5/2002 Haandrikman .... B01D 19/0063
                                                                 137/187
(Continued)

FOREIGN PATENT DOCUMENTS

GB     2429797       8/2010
WO     2002/46577 A1   6/2002
WO     2006/120537 A2  11/2006

OTHER PUBLICATIONS

A. Courbot, "Prevention of severe slugging in the Dunbar 16' multiphase pipeline," Offshore Technology Conference, 1996. (attached OTC paper).

(Continued)

*Primary Examiner* — Mark Connolly
(74) *Attorney, Agent, or Firm* — Karen R. DiDomenicis

(57) ABSTRACT

A method and a control system are provided for reducing the size and/or the frequency of hydrodynamic slugging in a fluid processing system. The fluid processing system includes a pipeline for conveying produced fluids and a vessel for receiving the produced fluids from the pipeline. A control valve is provided in the pipeline upstream of the vessel. A pressure sensor is provided upstream of the control valve. Pressure information from the pressure sensor is sent to a master control loop in a cascade control scheme in which the master control loop controls a slave control loop which in turn controls the control valve. The master control loop determines a set point of the slave control loop coupled to the control valve to achieve a pressure setpoint. The slave control loop, also referred to as a pseudo-flow controller, determines whether the control valve opening needs be modulated to achieve the setpoint of the slave control loop.

(Continued)

A method is also provided for retrofitting an existing fluid processing system.

7 Claims, 4 Drawing Sheets

(51) Int. Cl.
*F17D 3/05* (2006.01)
*F17D 1/00* (2006.01)
*F17D 5/00* (2006.01)
*G05B 15/02* (2006.01)
*E21B 43/34* (2006.01)

(56) References Cited

U.S. PATENT DOCUMENTS

| 7,239,967 | B2 | 7/2007 | Havre |
| 2006/0150749 | A1 | 7/2006 | Eken et al. |
| 2009/0173390 | A1 | 7/2009 | Slupphaug et al. |
| 2010/0307598 | A1* | 12/2010 | Cao ................ B01D 19/0063 137/2 |
| 2012/0165995 | A1* | 6/2012 | Crawley ................ G05D 7/00 700/282 |

OTHER PUBLICATIONS

John-Morten Godhavn, Mehrdad P. Fardb, Per H. Fuchs, New slug control strategies, tuning rules and experimental results, Journal of Process Control, vol. 15, Issue 5, Aug. 2005, pp. 547-557. (attached "Godhavn").

Godhavn, John-Morten, et al.; "Increased Oil Production by Advanced Control of Receiving Facilities"; 16$^{th}$ Triennial World Congress, Prague, Czech Republic, (2005), pp. 567-572.

Skofteland, G., et al.; "Suppression of Slugs in Multiphase Flow Lines by Active Use of Topside Choke—Field Experience and Experimental Results"; BHR Group 2003 Multiphase Technology, pp. 527-542.

* cited by examiner

METHOD AND SYSTEM FOR CONTROLLING HYDRODYNAMIC SLUGGING IN A FLUID PROCESSING SYSTEM

FIELD

The present disclosure relates to a method to reduce the size and/or frequency of hydrodynamic slugging in a fluid processing system including pipeline and having a control valve upstream of a vessel for first receiving produced fluids.

BACKGROUND

In fluid processing systems in which both gas and liquid phases flow through a pipeline or conduit, slug flow or slugging can occur when a large volume of gas or of liquid known as a slug travels through the pipeline. When liquid or gas slugs exit the pipeline at a processing facility, they can be produced at a rate which exceeds the ability of the fluid handling equipment to accommodate. Slugging behavior can be categorized as hydrodynamic slugging, terrain slugging, riser slugging, or operational slugging. Combinations of these types of slugging behavior can also occur. Hydrodynamic slugging is a known multiphase flow regime that occurs at certain values of superficial gas and liquid velocities. Terrain slugging is caused by the changes in elevation in a pipeline, e.g., in the case of subsea pipeline, a pipeline along an uneven seabed with large variations in elevation. The liquid phase accumulates at a low point to form a liquid slug which then moves in the pipeline when sufficient gas pressure builds up behind it. Riser-based slugging is a special form of terrain slugging associated with pipeline risers used in offshore oil production. Liquid accumulates at a low point or a bend in the riser to form a liquid slug which then moves in the riser once sufficient gas pressure is built up behind it to push the liquid slug over the top of the riser. Operational slugging is caused by operational changes, such as start-up of a wet gas facility, and is most often handled via ramp-up of the facility.

Various schemes have been tried to control slugging behavior in fluid processing systems, including subsea fluid processing systems. The accepted control approaches to the various categories of slugging are different, because the causes of the behaviors are different, although all result in slugging behavior. For hydrodynamic slugging, the use of a "pseudo-flow" controller in which fluid flow is calculated from an equation for volumetric liquid flow through a valve is the accepted conventional approach. For terrain slugging, the accepted approach is the use of pressure control, wherein the pressure is located upstream of the slug-forming area. For riser slugging, this is at the base of the riser. For both hydrodynamic and terrain slugging, the accepted control schemes for each modulate the control valve(s) located upstream of the topside vessel(s) first receiving produced fluids (e.g., a separator, slugcatcher, free water knock-out, etc.).

Topside choke valves upstream of a vessel for first receiving produced fluids have been used in fluid processing systems to control slugging. Slug control schemes are intended to control slugging behavior by reducing the size (in terms of volume) or frequency of slugging behavior, or eliminating it entirely. Maximum production occurs with the valve fully open, but this cannot control or prevent slugging. Known control schemes include pseudo-flow control, pressure control upstream of the slug forming area, pressure control upstream of the slug forming area cascaded to pseudo-flow control, and composite variable control. Each of these has practical disadvantages. The principle disadvantage of pseudo-flow slug control is that setpoint determination is difficult. Since the pseudo-flow is not an actual physical flow rate, determination of the setpoint is not obvious. Trial and error would be required to determine such a setpoint each time it would need to be adjusted.

It would be desirable to have a mechanism for controlling hydrodynamic slugging in a fluid processing system in a way that is more practical for field use than has been realized to date.

SUMMARY

In one aspect, a method is provided for reducing hydrodynamic slugging size and/or frequency in a fluid processing system. The fluid processing system includes a pipeline for conveying produced fluids, a vessel in fluid communication with the pipeline for receiving the produced fluids, a control valve having a percent opening in the pipeline, a densitometer for measuring density of the produced fluids, a pressure sensor upstream of the control valve, and a differential pressure sensor for measuring the differential pressure across the control valve. The method includes receiving pressure information from the pressure sensor and receiving a pressure setpoint in a master control loop. The method also includes receiving in a slave control loop controlled by the master control loop differential pressure information from the differential pressure sensor, and density information from the densitometer. In the slave control loop, a pseudo-flow rate is calculated according to the equation:

$$Q = Cv \times \sqrt{(\Delta P/\rho)}$$

where:
 Q=the calculated pseudo-flow rate of the produced fluids;
 Cv=a control valve coefficient dependent on the percent opening of the control valve;
 ΔP=the differential pressure across the slug control valve; and
 ρ=density of the produced fluids.

The master control loop determines a pseudo-flow rate setpoint using the difference between the pressure information received from the pressure sensor and the pressure setpoint. The slave control loop determines whether the percent opening of the control valve should be modulated to achieve the pseudo-flow rate setpoint using the difference between the calculated pseudo-flow rate and the pseudo-flow rate setpoint. Finally, the percent opening of the control valve is modulated responsive to the determination of the slave control loop.

In one aspect, a fluid processing system is provided. The fluid processing system includes a pipeline for conveying produced fluids; a vessel in fluid communication with the pipeline for receiving the produced fluids; a control valve having a percent opening in the pipeline; a densitometer for measuring density of the produced fluids; a pressure sensor upstream of the control valve; and a differential pressure sensor for measuring the differential pressure across the control valve. The fluid processing system further includes at least one processor. A first processor can be in communication with the pressure sensor, the densitometer and the differential pressure sensor. One processor, which can be the same as the first processor or a second processor in communication with the first processor, is in communication with the control valve. It is possible for all signals, i.e., density, pressure, and differential pressure, and the control valve to be in different, separate processors. It is also possible for all signals, i.e., density, pressure, and differential pressure, and the control valve to all be in one single processor.

In another aspect, a method for retrofitting a fluid processing system is provided. The method includes connecting the pressure sensor of an existing fluid processing system to a master control loop such that the master control loop can receive pressure information from the pressure sensor. The method further includes connecting the master control loop to a slave control loop wherein the slave control loop is further in communication with the control valve of an existing fluid processing system.

DESCRIPTION OF THE DRAWINGS

These and other objects, features and advantages of the present invention will become better understood with reference to the following description, appended claims and accompanying drawings where:

DETAILED DESCRIPTION

Figure 1:
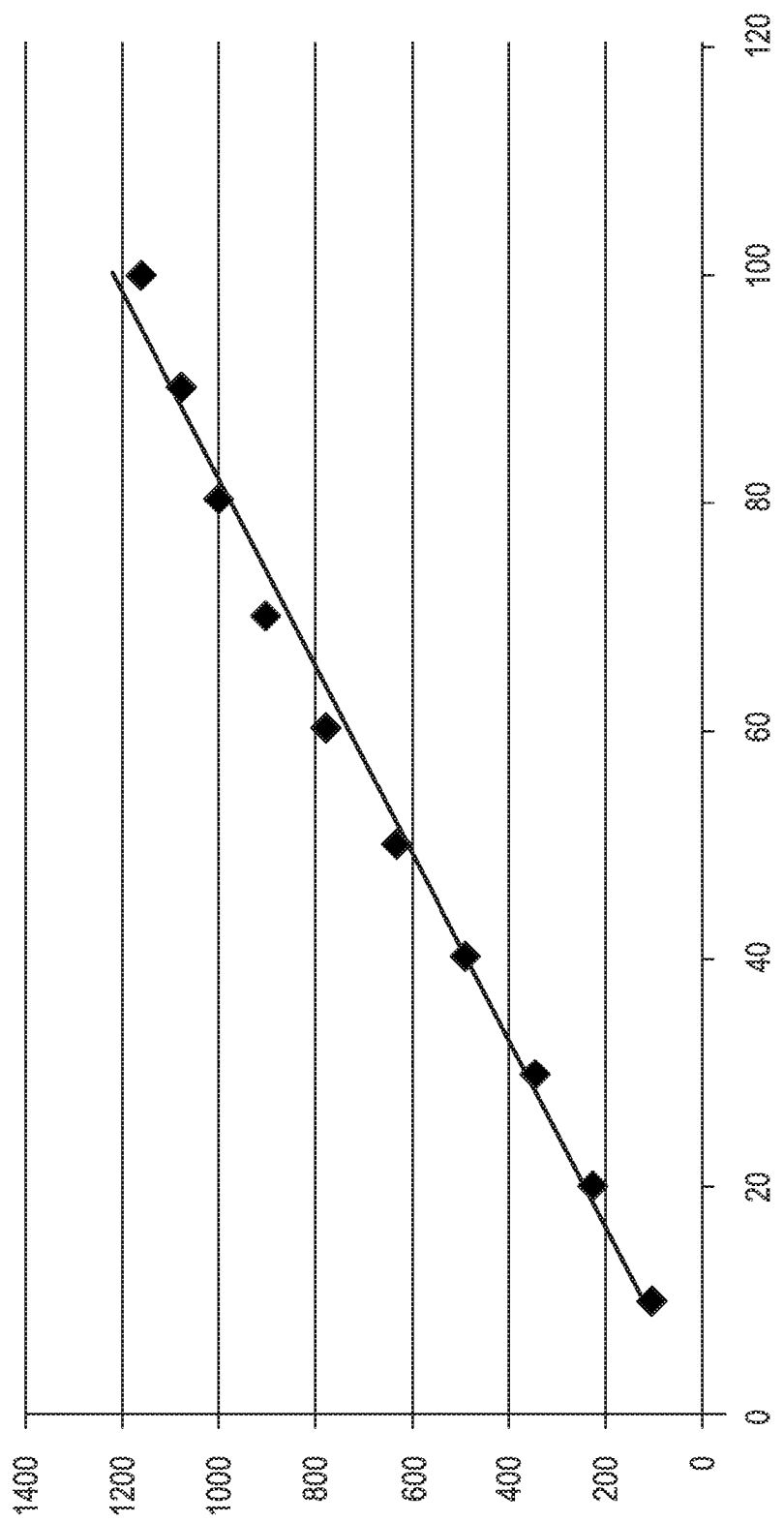
FIG. 1 is an exemplary plot of a relationship between control valve coefficient Cv and the percent opening of a control valve.

The slug control scheme is used in a method for reducing the size and/or frequency of slugging behavior in a pipeline system. The slug control scheme of the present disclosure is a cascade scheme. The term "cascade scheme" as used herein refers to a control scheme in which a master control loop determines the setpoint of a slave control loop. In turn, the slave control loop modulates a final control element, e.g., a valve, variable speed drive or the like. A cascade scheme consists of two or more control loops logically linked together. In the simplest form of a cascade scheme, there are only a master control loop and a slave control loop, but more complex arrangements are possible.

In the slug control scheme of the present disclosure, a pressure controller, also referred to as a master control loop, in a processor receives pressure information, also referred to as current pressure, from a pressure sensor and compares the pressure information to a pressure setpoint, also referred to as the desired pressure, determined by an operator. Also in the cascade scheme is a pseudo-flow controller, also referred to as a slave control loop, in a processor. The pressure controller and the pseudo-flow controller may reside on the same processor or separate processors in communication with one another. The pressure controller uses the difference between the pressure as received from the pressure sensor and the pressure setpoint to determine a pseudo-flow setpoint to be sent to the pseudo-flow controller.

The term "pseudo-flow," also referred to as pseudo-flow rate, as used herein refers to a flow rate calculated using a control valve liquid flow equation.

The term "pseudo-flow controller" as used herein refers to a slave control loop that uses the control valve liquid flow equation to calculate the pseudo-flow rate. The pseudo-flow controller compares the pseudo-flow rate as calculated with a pseudo-flow setpoint as determined by the master control loop to determine a percent control valve opening to be sent to the control valve based upon the difference between the calculated pseudo-flow rate and the pseudo-flow setpoint. Thus in one embodiment, the master control loop is a pressure controller, which determines the setpoint of the slave control loop, i.e., the pseudo-flow controller. The slave control loop in turn determines the percent opening of the control valve. In other words, the pseudo-flow controller is activated responsive to the determination of the processor thus modulating the valve. In some cases, the pseudo-flow controller will determine that the percent opening of the control valve need not be changed.

The slug control scheme of the present disclosure uses a control valve liquid flow equation to calculate a pseudo-flow rate through a control valve rather than determining flow using flow measurement devices at each respective production line or on the pipeline(s) upstream of the receiving vessel.

The following is the pseudo-flow rate equation used. Although the following control valve liquid flow calculation does not accurately represent the true flow rate, given the multiphase nature of the fluids in the pipe, the calculation is repeatable. It is therefore sufficient for control purposes.

$$Q = Cv \times \sqrt{(\Delta P/\rho)}$$

Where:
  $Q$ = Pseudo-flow rate
  $Cv$ = Control valve coefficient, dependent on the percent opening of the control valve
  $\Delta P$ = Pressure differential across the slug control valve
  $\rho$ = density The control valve coefficient Cv can be determined if the relationship between Cv and the percent control valve opening is known. This information is typically available from the control valve manufacturer. For example, one such relationship is illustrated in FIG. 1, wherein the y-axis represents the Cv values, and the x-axis represents the control valve percent opening.

The fluid processing system includes the control valve in a pipeline upstream of a vessel for first receiving produced fluids. Pressure is detected by a pressure sensor located upstream of the valve, and the pressure information is sent to a processor on which the pressure controller resides. In one embodiment, the pressure controller and the pseudo-flow controller logic reside on a single processor which executes the logic, in another embodiment, the pressure controller and the pseudo-flow controller reside on separate processors which execute the logic associated with the cascade scheme, where the separate processors are in communication with one another.

Unlike the known control schemes as described herein in the Background, the master pressure controller in the control scheme of the present disclosure does not use a calculated value that is not understood by the average person operating a production facility. Pressure is a well-understood measurement and permits an operator to determine an appropriate setpoint.

Figure 2:
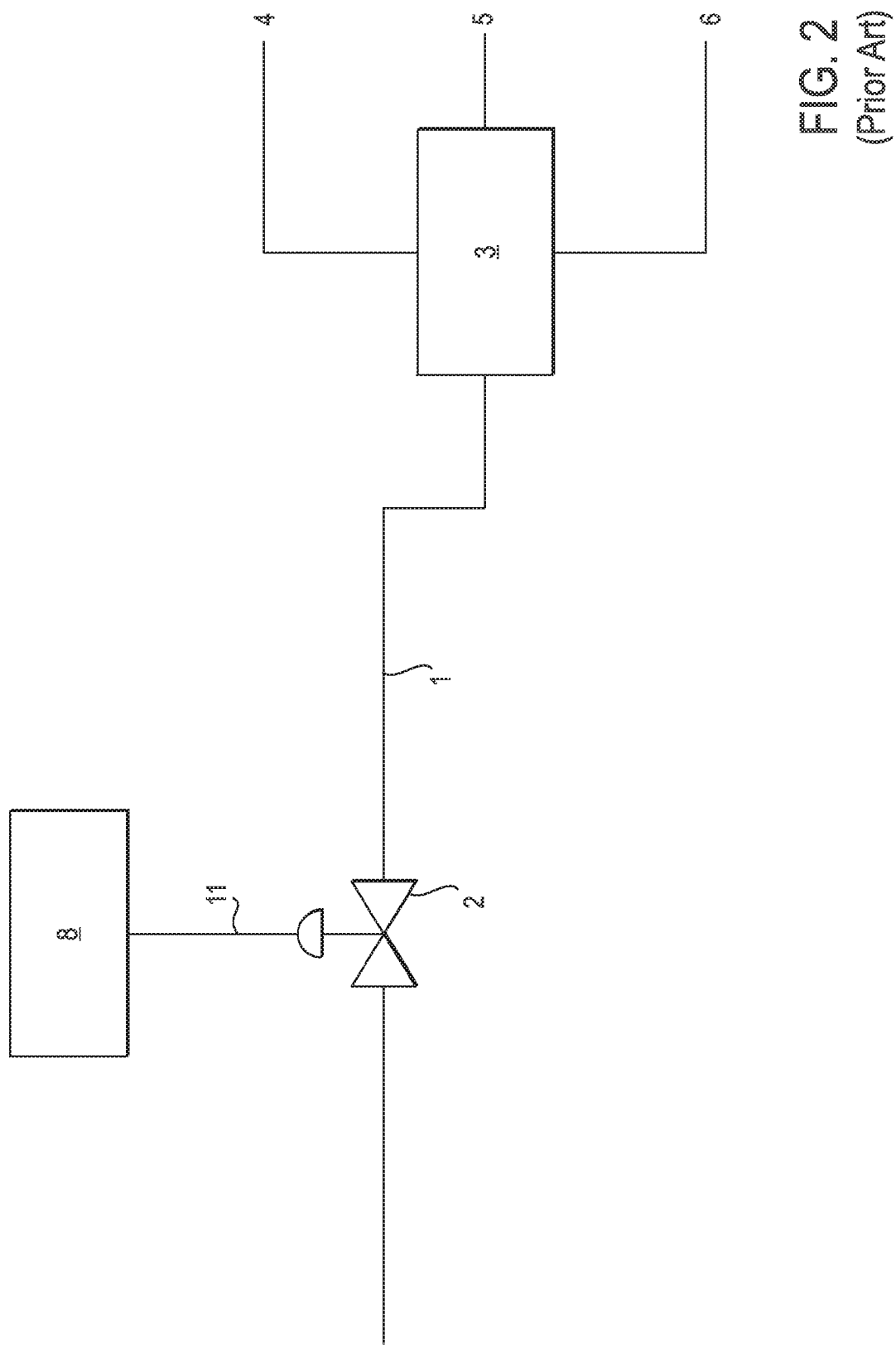
FIG. 2 is a schematic diagram illustrating a fluid processing system according to the prior art.

FIG. 2 is a schematic diagram illustrating an example of a fluid processing system according to the prior art. Multiphase produced fluids travel through a pipeline also referred to as a conduit 1 from an upstream production location (not shown) through a control valve 2. A vessel 3 first receives the produced fluids. The produced fluids can be separated into a gas stream 4, a hydrocarbon liquids stream 5 and a water stream 6. Alternatively, the produced fluids can be separated into only a gas stream and a liquids stream. The control valve 2 can be controlled by a pseudo-flow controller residing on a processor 8 connected by signal wire 11 to the control valve 2. In one embodiment, the control valve 2 can be a choke valve.

Figure 3:
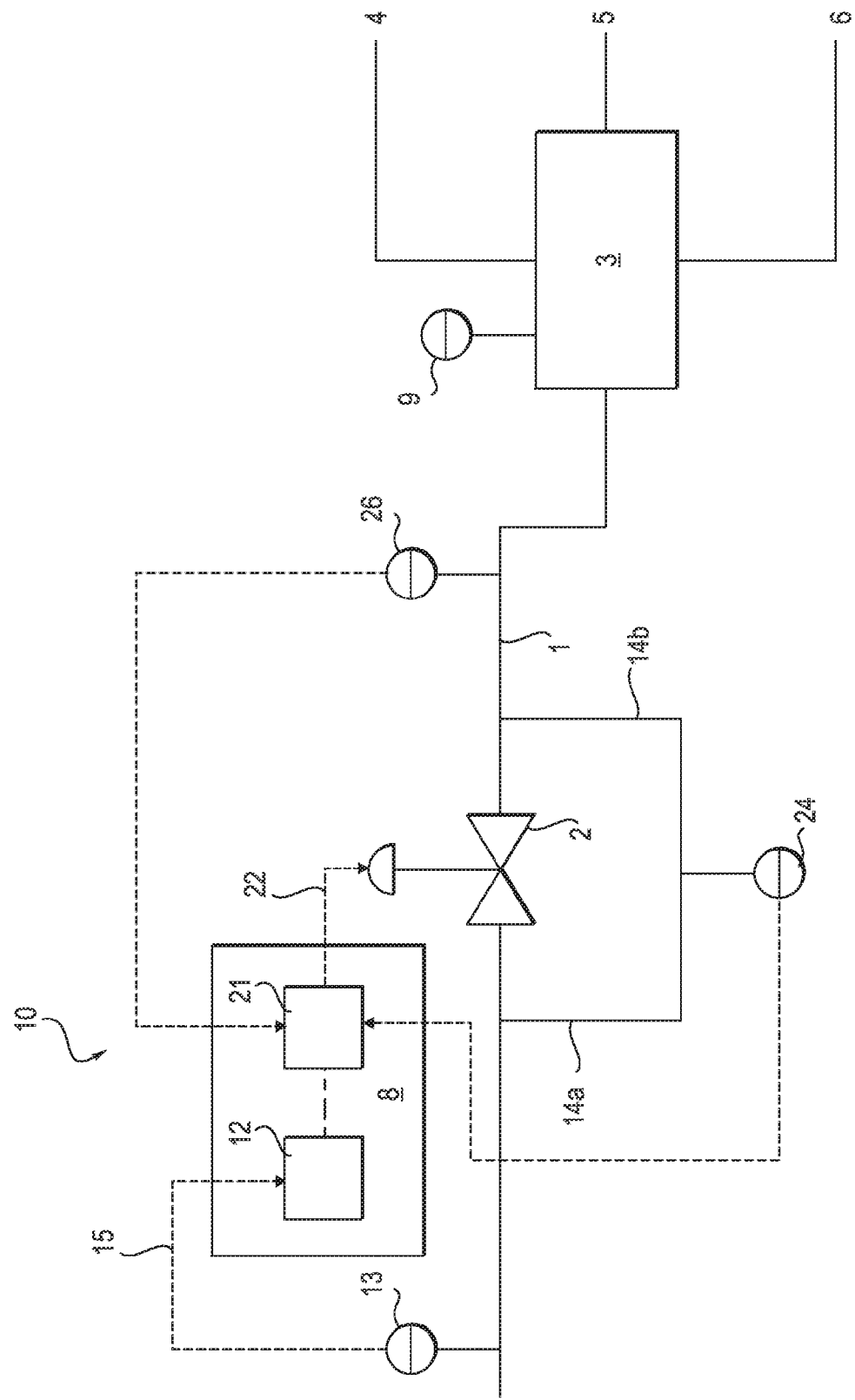
FIG. 3 is a schematic diagram illustrating a fluid processing system according to an exemplary embodiment.

FIG. 3 is a schematic diagram illustrating a fluid processing system 10 according to one embodiment including a pipeline also referred to as a conduit 1 for transporting produced fluids from an upstream production location (not shown). The fluid processing system 10 can include subsea pipeline. A vessel 3 is provided for first receiving the produced fluids via pipeline 1. The vessel 3 is the first vessel for receiving produced fluids downstream of a control valve 2. The vessel 3 can be any vessel used to receive production fluids prior to further processing, e.g., separator, a slug-catcher, or a free water knock-out vessel. The produced fluids may be separated into a gas stream 4, a hydrocarbon liquids stream 5 and a water stream 6. Alternatively, the produced fluids may be separated into a gas stream and a liquids stream. Fluid flow through pipeline 1 is controlled by the control valve 2.

In one embodiment, a pressure sensor 13 is located upstream of the control valve 2. The pressure sensor 13 senses the pressure in the conduit in which the pressure sensor 13 is located. Pressure information detected by the pressure sensor 13 is sent to a pressure controller (residing on a processor) 12 via line 15. The pressure sensor can be any type of pressure sensor.

In one embodiment, a differential pressure sensor 24 is used to measure the pressure differential across the valve 2. The differential pressure sensor 24 sends differential pressure information to the pseudo-flow controller 21. Suitable differential pressure sensors include any practical means for determining the differential pressure across the control valve 2. For example, differential pressure sensors are available for sensing a pressure differential between the upstream side and the downstream side of the control valve 2, connected to the upstream side via line 14a and the downstream side via line 14b. Alternative means for determining the differential pressure can include the use of two different pressure sensors, one on each side of the control valve 2. Signals from the two different pressure sensors can be sent to the processor which would calculate the differential pressure across the control valve 2.

The fluid processing system 10 can optionally include a densitometer 26 for measuring the density of the produced fluids in the pipeline 1. The densitometer can be located upstream or downstream of the control valve 2. As with any of the sensors used, wired or wireless sensors can be used. The densitometer 26 sends density information to the pseudo-flow controller 21.

The pressure controller 12 is in communication with a pseudo-flow controller (residing on a processor 8) 21 which is in turn in communication with the control valve 2 via signal wire 22. The pressure controller 12 uses the pressure information to determine a set point of the pseudo-flow controller 21 to achieve a desired operating pressure. The pseudo-flow controller 21 can be activated in response to the determination of the pressure controller 12. The pressure controller 12 can deliver a control signal or cause a control signal to the pseudo-flow controller 21. In one embodiment, based on the determination of the pressure controller 12, the pressure controller 12 executes software to deliver the control signal to the pseudo-flow controller 21 which in turn controls the control valve 2.

In one embodiment, there are multiple pipelines 1 feeding a single vessel 3. In such case, the multiple pipelines 1 can feed a single conduit upstream of the vessel 3, and slug control can be provided by including a control valve 2 in the conduit. Alternatively, a control valve 2 can be provided in each of the multiple pipelines 1.

In one embodiment (not shown), there can be multiple pipelines 1 feeding multiple vessels 3, in which the number of pipelines may or may not match the number of vessels. In this case, control may be performed using control valves on the pipelines and/or control valves located directly upstream of the vessels.

The processor(s) on which the pressure controller and the pseudo-flow controller reside can be any type of processor associated with conventional control systems.

In one embodiment, an existing fluid processing system including a pipeline and having a vessel for first receiving produced fluids can be retrofitted to reduce the size and/or frequency of slugging behavior in the system. If not already installed, a control valve can be installed in a conduit upstream of the vessel. A processor can be provided with a control scheme including a master control loop and a slave control loop, also referred to as a pressure controller and a pseudo-flow controller, respectively. In another embodiment, the master control loop resides on one processor and the slave control loop resides on another processor in communication with one another. The pseudo-flow controller is coupled to a control valve. A pressure sensor can be installed such that it is located upstream of the control valve. The pressure controller is coupled to the pressure sensor. If not already present, a densitometer and a differential pressure sensor can also be installed in the existing system.

The vessel for first receiving produced fluids can have a number of optional controllers (not shown) that can be used to control other variables, as known in the art, such as water level in the vessel using a combination of a level controller and a control valve, liquid hydrocarbon level in the vessel using a combination of a level controller and a liquid hydrocarbon control valve, and pressure in the vessel using a combination of a pressure controller and a pressure control valve.

EXAMPLE

FIG. 3 illustrates a slug control scheme in which a master control loop (pressure controller) upstream of a slug control valve in the form of a control valve is cascaded to a slave control loop (pseudo-flow controller) residing as logic on a processor. A simulation of the slug control scheme illustrated in FIG. 3 was run to evaluate the scheme for hydrodynamic slugging. Modeling of exemplary pipeline slugging control schemes was done using UniSim® Design (USD) process modeling software available from Honeywell Process Solutions, a division of Honeywell International, Inc., Morristown, N.J. The slugging behavior was modeled using OLGA Dynamic Multiphase Flow Simulator software available from Schlumberger Ltd., Houston, Tex. The fluid processing systems modeled included subsea pipeline conveying fluids from subsea production wells into a topsides vessel, i.e., a slug catcher. The models of the slug control valve and receiving vessel were configured in UniSim® Design (USD) process modeling software. The control scheme was configured with a cascade of controllers, a spreadsheet calculation of the pseudo-flow and a choke valve actuated according to pseudo-flow controller output as shown in FIG. 3. The basic model configuration used integrated the OLGA simulation model into the USD process model, both synchronized to run in transient or dynamic, i.e., time-variant, mode. A spreadsheet calculation was performed by a processor in USD to calculate the pseudo-flow rate from the fluid density and differential pressure across the choke valve, as well as the current valve position. The pseudo-flow rate was used as the input for the slave control loop, also referred to as the pseudo-flow controller. The pressure controller sent a setpoint to the pseudo-flow controller. The pseudo-flow controller executed logic to determine whether the opening position (i.e., percent open) of the choke valve needed to be modulated. The entire simulation and all components of it (i.e., simulated variables such as pressure and simulated controllers) were all run on a processor.

Figure 4:
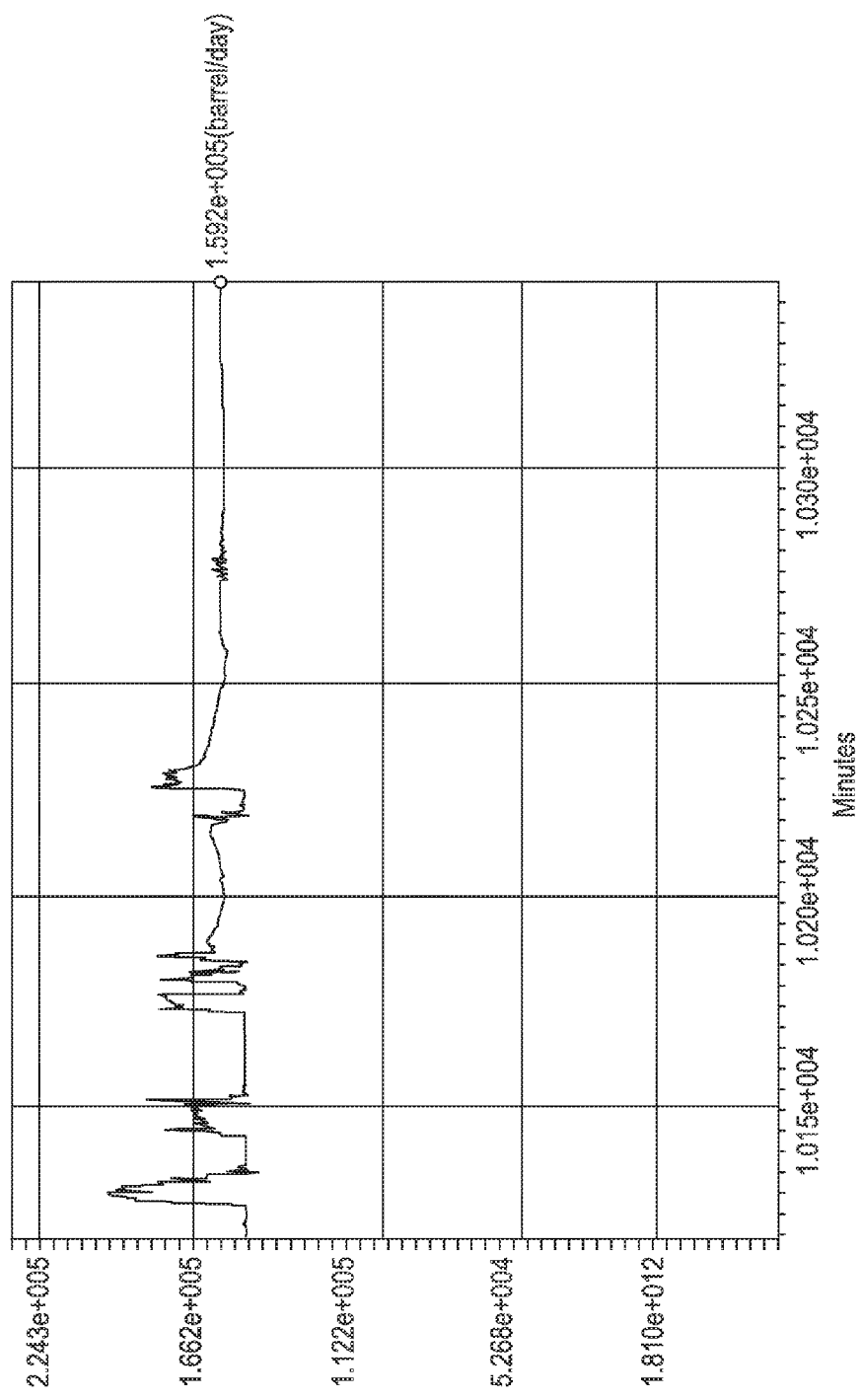
FIG. 4 is a plot illustrating the effects of a slug control scheme according to an exemplary embodiment on slugging behavior in a simulation of a processing facility.

FIG. 4 is a plot showing the total multiphase flow rate (in barrels per day) into the first receiving vessel. The plot was generated by the combined OLGA and USD simulation software. As can be seen, coincident with the use of the control scheme, hydrodynamic slugging behavior indicated by large fluctuations in the plot of flow rate, ceased.

Through the use of the system of the present disclosure, the volume and/or frequency of liquid and/or gas slugs in the fluid processing system can advantageously be reduced or eliminated. Furthermore, the volume and/or frequency of liquid and/or gas slugs in the fluid processing system can be reduced as compared with an equivalent fluid processing system in which no choke valve is present or the choke valve is fully open. Through the use of the system of the present disclosure, hydrodynamic slugging behavior in the fluid processing system can advantageously be eliminated or reduced, while facilitating the determination of a control valve opening over time.

Where a system component is described in the singular, it should be understood that more than one of the system components may also be present. For instance, multiple pipelines are contemplated in the pipeline system. Multiple vessels can be used for receiving production fluids. Multiple control valves can be used. It should be noted that only the components relevant to the disclosure are shown in the figures, and that many other components normally part of a fluid processing system are not shown for simplicity.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for reducing hydrodynamic slugging size and/or frequency in a fluid processing system comprising a pipeline for conveying produced fluids, a vessel located at a surface location in fluid communication with the pipeline for receiving the produced fluids, a control valve having a percent opening in the pipeline wherein the control valve is located at the surface location, a densitometer for measuring density of the produced fluids, a pressure sensor, and a differential pressure sensor for measuring the differential pressure across the control valve, the method comprising:

a. receiving pressure information from the pressure sensor in a master control loop wherein the pressure sensor is located at the surface location and upstream of the control valve;
b. receiving a pressure setpoint in the master control loop;
c. receiving differential pressure information from the differential pressure sensor in a slave control loop controlled by the master control loop wherein the differential pressure sensor is located at the surface location; and
d. receiving density information from the densitometer in the slave control loop wherein the densitometer is located at the surface location;
e. receiving current control valve percent opening information in the slave control loop;
f. calculating a calculated pseudo-flow rate for use in the slave control loop according to the equation:

$$Q = Cv \times \sqrt{(\Delta P/\rho)}$$

where:
  i. Q=the calculated pseudo-flow rate of the produced fluids;
  ii. Cv=a control valve coefficient dependent on the percent opening of the control valve;
  iii. ΔP=the differential pressure across the control valve; and
  iv. ρ=density of the produced fluids;
g. determining by the master control loop a pseudo-flow rate setpoint using the difference between the pressure information received from the pressure sensor and the pressure setpoint;
h. determining by the slave control loop whether the percent opening of the control valve should be modulated to achieve the pseudo-flow rate setpoint using the difference between the calculated pseudo-flow rate and the pseudo-flow rate setpoint; and
i. modulating the percent opening of the control valve responsive to the determination of the slave control loop;
  thereby reducing hydrodynamic slugging size and/or frequency in the fluid processing system.

2. The method of claim 1, wherein the pipeline is located at a subsea location.

3. The method of claim 1, wherein each of the pressure information, differential pressure information and density information as measured by the pressure sensor, differential pressure sensor and densitometer are converted to digital information readable by a processor.

4. The method of claim 1, wherein the pressure information, the differential pressure information and the density information are received by a single processor.

5. The method of claim 1, wherein the pressure information, the differential pressure information and the density information are received by multiple processors in communication with one another.

6. The method of claim 1, wherein the control valve is a choke valve.

7. The method of claim 1, wherein the vessel is selected from the group consisting of a high pressure separator, a slugcatcher, and a free water knock-out vessel.

* * * * *